United States Patent [19]

Megles, Jr. et al.

[11] 4,023,953
[45] May 17, 1977

[54] APPARATUS AND METHOD FOR PRODUCING COMPOSITE GLASS TUBING

[75] Inventors: John E. Megles, Jr.; Timothy W. Richardson, both of Corning, N.Y.

[73] Assignee: Corning Glass Works, Corning, N.Y.

[22] Filed: Aug. 7, 1975

[21] Appl. No.: 602,649

[52] U.S. Cl. .................................. 65/86; 65/121; 65/145; 65/187; 65/325

[51] Int. Cl.² ............................................ C03B 15/14

[58] Field of Search ............... 65/86, 87, 145, 187, 65/325, 121

[56] References Cited

UNITED STATES PATENTS 1,421,810  7/1922  Mulholland .................. 65/325

FOREIGN PATENTS OR APPLICATIONS 1,223,064  1/1960  France .................. 65/145

*Primary Examiner*—Arthur D. Kellogg
*Attorney, Agent, or Firm*—Milton M. Peterson; Clinton S. Janes, Jr.; Clarence R. Patty, Jr.

[57] ABSTRACT

There is disclosed a method of making composite glass tubing, and a molten glass feeding apparatus uniquely designed to carry out such method. The feeder apparatus comprises concentrically-arranged cylindrical containers, a blow tube located within the central container, and a plug member mounted on the base of the blow tube. The bottom portion of each cylindrical wall is downwardly and inwardly directed to provide restricted annular bottom openings. The bottom edges of the cylindrical walls and of the plug are positioned in such relation to each other that orifices are provided through which annular streams of molten glass may flow and contact adjacent streams in the fluid state, thereby forming composite glass tubing having at least three layers.

5 Claims, 4 Drawing Figures

APPARATUS AND METHOD FOR PRODUCING COMPOSITE GLASS TUBING

BACKGROUND OF THE INVENTION AND PRIOR ART

It is known in the glass art to form multi-layer, composite, glass bodies. U.S. Pat. No. 3,673,049, granted June 27, 1972 to J. W. Giffen et al., describes composite glass bodies comprising a tensilely stressed core and a compressively stressed surface layer, whereby the physical strength of the body is enhanced. This patent further discloses a method of producing such bodies wherein glass streams are brought together in the molten state to avoid formation of defects at the interface. Such method of producing a composite glass sheet, and a glass feeder apparatus specifically designed for carrying out the method, are the subject of U.S. Pat. No. 3,582,306 granted June 1, 1971 to J. W. Giffen. U.S. Pat. No. 3,597,305, granted Aug. 3, 1971 to J. W. Giffen, describes a laminated body embodying one or more subsurface, compressively stressed layers that fortify the body against propagation of surface cracks or bruises.

The production and use of encased glass cane as a substrate for film type resistors is described in U.S. Pat. No. 3,437,974 granted Apr. 8, 1969 to J. Spiegler. U.S. Pat. No. 3,676,043, granted July 11, 1972 to J. W. Anderson et al., describes a photoflash lamp having a three layer, laminated glass envelope. The coefficient of thermal expansion of the middle glass layer is higher than that of the inner and outer glass layers so that the latter are in compression and the middle layer is in tension.

The Anderson et al. patent suggests a method of producing the composite lamp envelope wherein glass tubes are arranged in close fitting, concentric assembly, and the assembly is progressively thermally softened for redrawing as a composite tube. However, in such redrawing process, it is difficult to avoid entrapment of particles, gas bubbles, and other foreign material at the interface. The patent also suggests, but does not depict or describe, the use of a tube forming mandrel surrounded by an orifice consisting of separate rings.

SUMMARY OF THE INVENTION

The present invention provides an improved method of forming composite glass tubing, that is glass tubing composed of three or more concentric layers of glass. It further provides a novel glass feeder apparatus for carrying out such method. More particularly, the invention provides a means for adapting to the production of tubing the principle of the earlier-mentioned Giffen patents whereby molten glasses are brough together while avoiding exposure of the separate glasses to detrimental gaseous media, and thereby avoiding defects at the interfaces between the glasses.

The invention further provides an economic method of producing tubing composed of relatively thin inner and outer layers having certain desired physical characteristics, a relatively larger central or core layer of compatible, but substantially less expensive, glass and, optionally, additional subsurface layers. For example, the skin or surface layers of glass may have a lower coefficient of thermal expansion than the inner or core portion whereby the tubing is mechanically strengthened. Also, the skin or cladding glass layers may be characterized, with respect to the inner core glass, by improved chemical durability, improved electrical resistivity, or selective color effects.

The glass feeder apparatus of the invention comprises a central, cylindrical container and annular, cylindrical containers surrounding the central container, the containers being defined by concentric, spaced, cylindrical walls, a blow tube centrally located in the central, cylindrical container and carrying a plug member mounted on the bottom end thereof, the bottom portion of each wall being inwardly and downwardly directed to provide restricted bottom openings, the bottom edges of such walls and of such plug being so positioned relative to each other as to provide orifices through which annular streams of glass may flow and engage adjacent streams in the fluid state to form a composite glass tube, and removable means for preventing flow of glass from such orifices. The invention further embodies a method of making glass tubing comprising forming concentric reservoirs of molten glass, the glass in a middle reservoir preferably having physical characteristics that differ from the glass in adjacent reservoirs, thermally adjusting the viscosity relationship of the glasses to provide a desired flow of each glass, flowing streams of glass from annular orifices in the base of the glass reservoir system, joining the annular streams of glass as they flow from the orifices to form a tubular composite, and introducing air pressure through the central reservoir to maintain a desired diameter in the composite tubing. The invention is further described with reference to a preferred embodiment, as illustrated in the attached drawing, whereby three layer, composite tubing is formed. Those skilled in the art will readily perceive the necessary modifications to provide additional layers if desired.

GENERAL DESCRIPTION OF THE INVENTION

Figure 1:
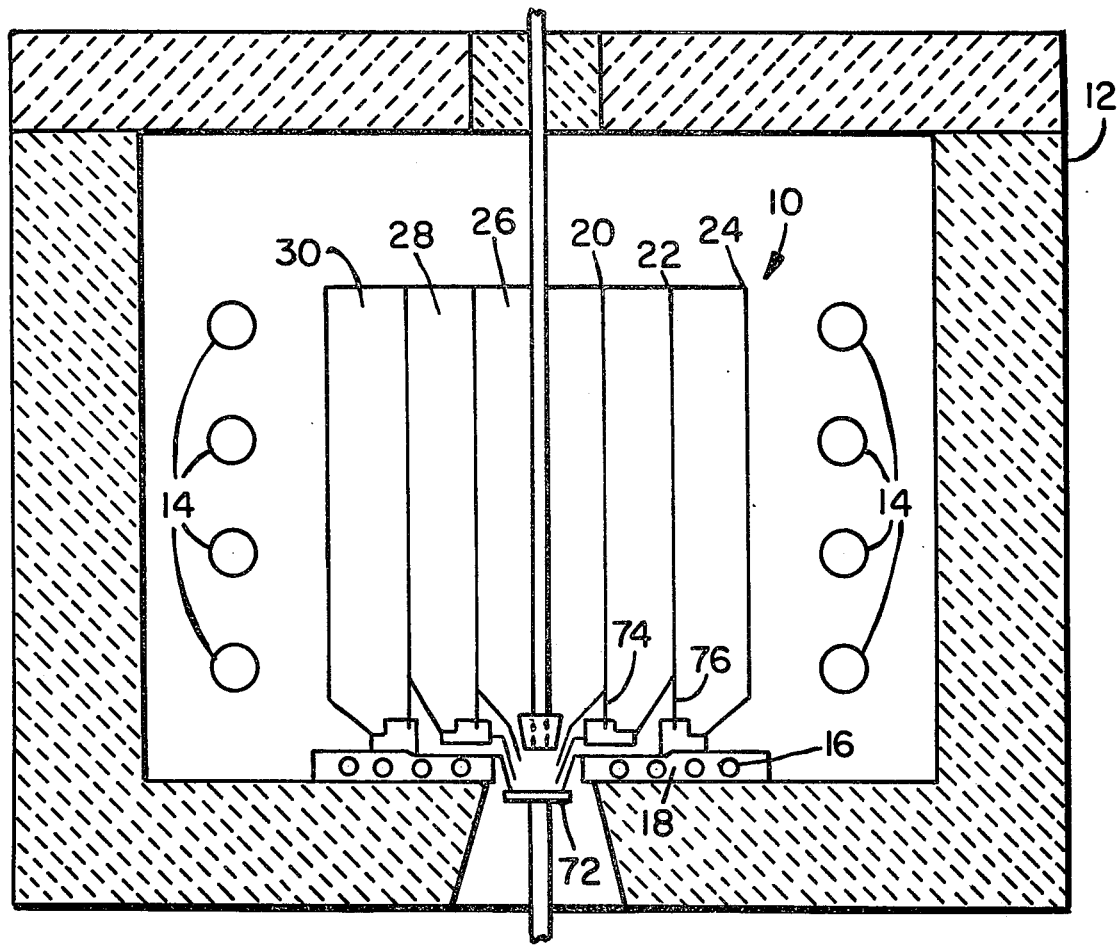
FIG. 1 is a front elevational view of a glass feeding apparatus mounted in a heating chamber for operation in accordance with the invention.
Figure 2:
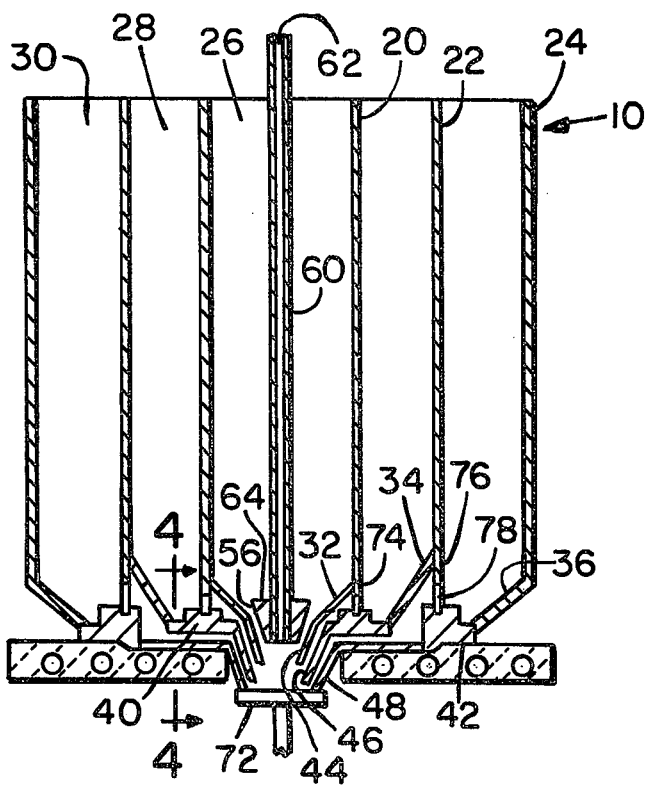
FIG. 2 is an enlarged view of the feeding apparatus of FIG. 1.

Referring to the drawings, a molten glass feeder assembly 10 is encased within a refractory housing 12 shown as a brick box furnace. Furnace 12 is provided with solid rod heating units 14 as the primary heat source with supplemental heating from wire winding 16 in refractory base or support 18 upon which assembly 10 rests.

Feeder assembly 10 provides a series of concentric chambers or reservoirs 26, 28 and 30, intended to function as sources of molten glass although here shown empty for convenience of illustration. Accordingly, assembly 10 is preferably fabricated from a relatively inert refractory material such as platinum. The various chambers are defined by concentric, cylindrical wall sections 20, 22 and 24, each of progressively increasing diameter. Thus, wall 20 defines a cylindrical chamber 26 while walls 20 and 22 define an annular chamber 28, and walls 22 and 24 define a second, and larger diameter, annular chamber 30.

Each of walls 20, 22 and 24 has an inwardly and downwardly extending projection which cooperatively define paths of molten glass flow as subsequently described in greater detail. Thus, walls 20, 22 and 24, respectively, have corresponding sections 32, 34 and 36 which extend generally inwardly and downwardly; walls 22 and 24 have corresponding sections 40 and 42 which extend generally inwardly with the latter forming a base on which the container assembly rests; and walls 20, 22 and 24 have corresponding sections 44, 46 and 48 which extend generally downwardly, with a small, but necessary, inward component. Sections 44, 46 and 48 terminate in corresponding annular edges 50, 52 and 54.

Walls 20 and 22, the inner two walls in assembly 10, are also provided with downward extension 74, which bears against adjacent base section 40, and extension 76 which bears against base section 42 and thus serves as a support for the assembly. Where it is desirable to maintain the wall sections separable for ease in assembly and disassembly, a tight fitting tongue and groove assembly may be employed as shown. In general, however, greater rigidity is desirable and a welded construction is employed. Further, it will be apparent that additional supports between chamber walls 20, 22 and 24 may be provided as desired.

Figure 4:
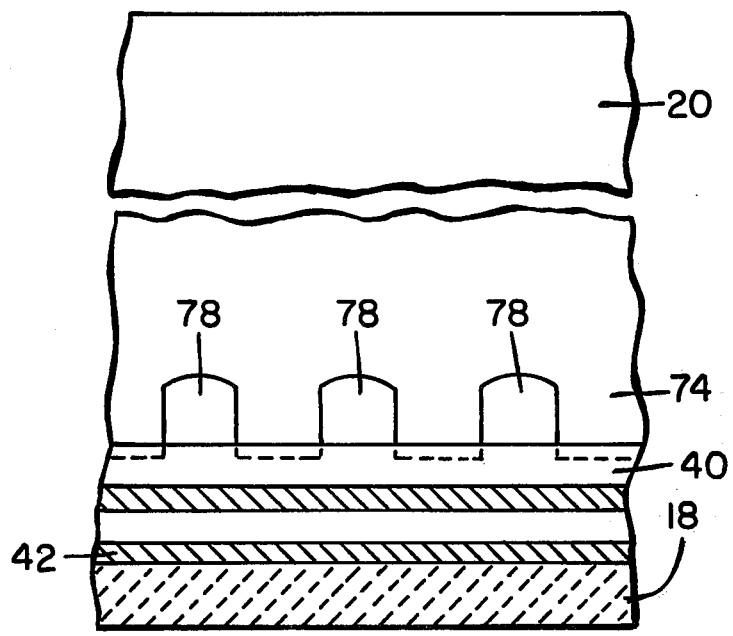
FIG. 4 is a partial sectional view along line 4—4 of FIG. 2.

As best illustrated in FIG. 4, extensions 74 and 76 are provided with spaced openings or gates 78 which permit glass flow from vertical chambers 28 and 30 into the respective passageways leading to orifices 68 and 70. While these openings are here shown in the form of arches, it will be apparent that they may be of any shape and size consistent with the functions of providing adequate glass flow and adequate assembly support.

Feeder assembly 10 further comprises a tubular member 60 which is positioned generally along the central axis 62 of the assembly, and which serves to introduce air under pressure into the system for a purpose described in detail later. Air tube 60 has a plug 64, in the nature of an inverted, truncated cone, mounted on its lower end, plug 64 having a lower annular edge 56 in spaced relation to annular edge 50 on the lower extension 44 of wall 20. Means for supplying air under pressure to tube 60 is not shown since it comprises no inventive feature.

Figure 3:
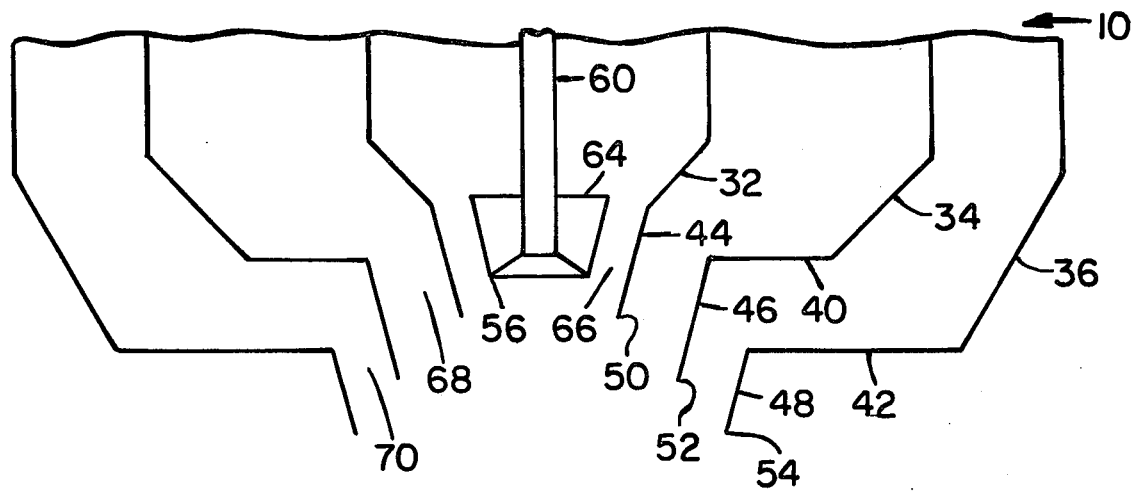
FIG. 3 is a partial schematic view of the feeder apparatus showing in greater detail the orifice arrangement for glass delivery.

As most clearly shown in FIG. 3, terminal edges 50, 52, and 54 of walls 20, 22 and 24, and edge 56 of plug 64, are spaced vertically and horizontally from one another. This provides an upwardly and inwardly stepped arrangement which defines annular orifices 66, 68 and 70 through which streams of glass can issue and immediately join to form a three ply composite glass tube. The stepped arrangement, in conjunction with the inward components of wall sections 44, 46 and 48, insures uniform relative glass flows from the several orifices and avoids tendencies for one glass to creep over a terminal edge and partially occupy or obstruct an adjacent stream.

It will be appreciated that the wall thicknesses of the glass plies, or layers, in the composite glass tube will depend on the thicknesses of the glass streams which are joined together to form the composite tube, and that the thicknesses of these streams will in turn be a function of the relative orifice sizes and the viscosity of the respective glasses. In general, each glass will be brought to a predetermined viscosity value in the range of 5,000 to 100,000 poises for tube drawing.

DESCRIPTION OF SPECIFIC EMBODIMENT

By way of further illustrating the invention, a specific operation of the apparatus described above is now set forth.

Initially, each of chambers 26, 28 and 30 is supplied with molten glass. While each of the chambers may be supplied with a different glass, it is customary practice to provide the same glass in chambers 26 and 30, such glass thus functioning as the inner and outer skin or cladding glass in the composite tube. Thus, the present operational example is directed at the production of mechanically strengthened tubing wherein the core glass provided in central chamber 28 has a higher coefficient of thermal expansion than the skin glass supplied to chambers 26 and 30. More specifically, the core glass is a standard commercially available lime glass having an expansion coefficient on the order of $90 \times 10^{-7}/° C.$, while the skin glass supplied to chambers 26 and 30 is a compatible glass having a lower expansion coefficient on the order of $65 \times 10^{-7}/° C.$, both coefficients being average values over the temperature range of 0–300° C.

The present operational example is a batch type operation in which a predetermined quantity of premelted glass (cullet) is provided in each chamber. The container is then placed in furnace 12 which is heated to a temperature of about 1300° C. to melt down and fine the glasses. Subsequently, the furnace temperature is reduced to a temperature in the range of 900–1000° C. and individual glass temperatures adjusted, if necessary, to provide suitable viscosities for tube drawing. Those familiar with the art will appreciate that auxiliary heating, such as coil heater 16, may provide different, but controlled, temperatures in the various chambers, and thereby provide glasses of particular viscosity for dimension control.

It will be appreciated that, in a continuous operation, each of chambers 26, 28 and 30 would be supplied with molten glass from an external melting source, and that suitable heating and/or cooling means would be provided to bring each of the glasses to a suitable temperature-viscosity relationship as the glasses reach the orifices for tube drawing.

Prior to initiating tube drawing, plug 72, which may be water or air cooled, is maintained against the bottom of heater assembly 10 to close orifices 66, 68 and 70 thereby preventing glass flow until desired. When it is desired to initiate tube drawing, plug 72 is withdrawn to permit flow from the orifices, and conical plug 64 on tube 60 is moved upward to permit an annular stream of glass to issue from orifice 66. As already pointed out, the relative amount of glass flowing in each stream is dependent on the several glass viscosities as well as the sizes of the orifice openings, thus being capable of variation and control by one skilled in this art.

As the glass streams issue from the respective orifices, they immediately come together to form a composite tube composed of three annular layers corresponding to the three glass streams, but without any exposure to foreign particles, or gaseous environment, occurring. As the composite tube thus formed cools to a rigid body, this body is free from inclusions or defects at the interface between each adjacent pair of glass layers.

As the composite tube thus formed issues from the orifices, conventional tube drawing means (not shown) may be employed to draw the tubing in usual manner.

Further, it will be understood by those skilled in the art that air pressure will be applied to tube 60 to maintain the desired diameter within the tubing as it is drawn. It will also be understood that numerous changes may be made in the details of the process and apparatus as hereindescribed, and that the invention contemplates such changes within the scope of the claims that follow. In particular, it will be understood that additional concentric reservoirs may be provided, and any desired arrangement of glasses may thus be provided in the composite tube. Specifically, one or more subsurface, compressively stressed layers may be provided if desired.

We claim:

1. Apparatus for forming concentric glass tubing having at least three layers directly from separate sources of molten vitreous material while avoiding exposure of such separate sources to detrimental gaseous media during the formation of such tubing, said glass layers being selected such that each has a different composition from that of an adjacent layer, which comprises a molten glass feeder assembly resting upon a refractory base having an annular orifice therein, said assembly consisting of a flow-through refractory container having concentric cylindrical walls of increasing diameter which define at least three sources of molten vitreous material, an inner wall defining a central cylindrical chamber and each adjacent pair of walls defining an annular chamber of substantially uniform diameter, each wall having an inwardly and downwardly extending projection terminating in a section which extends generally downwardly with an inward component into said annular orifice in said refractory base to define an opening of reduced size at its terminus, the inner walls having extensions which bear against the inwardly extending portion of the next adjoining wall and said extensions having spaced openings to permit inward lateral glass flow from the adjacent chamber, a vertically movable, inwardly-tapered plug member positioned within the central cylindrical chamber and carrying a source of air pressure to maintain the dimensions of said concentric glass tubing, the terminal edges of the downwardly extending bottom projections of the walls and the plug member being positioned relative to each other in an inwardly and upwardly stepped arrangement so as to form adjacent annular orifices of predetermined spacing to deliver concentric, uniform streams of glass which unite in a single tubular stream as they issue from the orifices.

2. An apparatus in accordance with claim 1 wherein the refractory container has three concentric cylindrical wall sections and the sources of molten material thus defined deliver three concentric streams of glass.

3. A method for making glass tubing composed of at least three layers comprising the steps of:
   a. forming a central reservoir of molten glass in cylindrical relationship around a blow tube for the introduction of air under pressure;
   b. forming at least two additional reservoirs of molten glass in cylindrical, concentric relationship with said central reservoir, the glass compositions in said central reservoir and said additional reservoirs being selected such that each has a different composition from that in an adjacent reservoir;
   c. thermally adjusting the viscosity relationship of the molten glasses in the said reservoirs to provide a desired flow of each;
   d. simultaneously flowing a stream of molten glass through an annular orifice in each reservoir, said streams having concentric uniform glass flows;
   e. joining the annular streams issuing from said orifices while air under pressure is introduced through said blow tube to form, and maintain a desired diameter in, a composite glass tube composed of at least three layers wherein the interface between adjacent pairs of glass layers is free from inclusions or defects.

4. A method according to claim 3 wherein said glass tubing is composed of three layers of glass.

5. A method according to claim 4 wherein the middle layer of glass has a higher coefficient of thermal expansion than either of the outer layers.

* * * * *